United States Patent

Null

[15] 3,636,859
[45] Jan. 25, 1972

[54] ULTRASONIC COOKING APPARATUS

[72] Inventor: Lawrence E. Null, Albuquerque, N. Mex.

[73] Assignee: Energy Conversion Systems, Inc., Albuquerque, N. Mex.

[22] Filed: Oct. 20, 1969

[21] Appl. No.: 867,571

[52] U.S. Cl. ..........................................99/348, 259/DIG. 44
[51] Int. Cl. .......................................................A47J 27/00
[58] Field of Search..................99/348, 359, 360, 367, 366, 99/249, 250, 251, 252, 253, 234, 217; 259/72, 1

[56] References Cited

UNITED STATES PATENTS

| | | | |
|---|---|---|---|
| 2,531,378 | 11/1950 | Skinner | 99/348 |
| 2,591,601 | 4/1952 | Peters | 99/348 |
| 3,001,532 | 9/1961 | Plassmeyer | 259/DIG. 43 |
| 3,259,272 | 7/1966 | Larson | 259/DIG. 43 |

*Primary Examiner*—Robert W. Jenkins
*Attorney*—James E. Snead and William R. Hinds

[57] ABSTRACT

An improved apparatus and method for cooking utilizing the application of ultrasonic energy above the audible frequency range and below the microwave frequency range to increase the speed and efficiency of cooking. The apparatus comprises a heat source coupled to a container with liquid cooking medium therein, an ultrasonic power supply and transducer and an acoustic horn for coupling the ultrasonic energy through the liquid cooking medium into the item being cooked. The method comprises the steps of placing the food to be cooked in a liquid cooking medium, heating the cooking medium to cooking temperature for the particular food involved and applying to the cooking medium sound energy in the ultrasonic frequency range.

5 Claims, 3 Drawing Figures

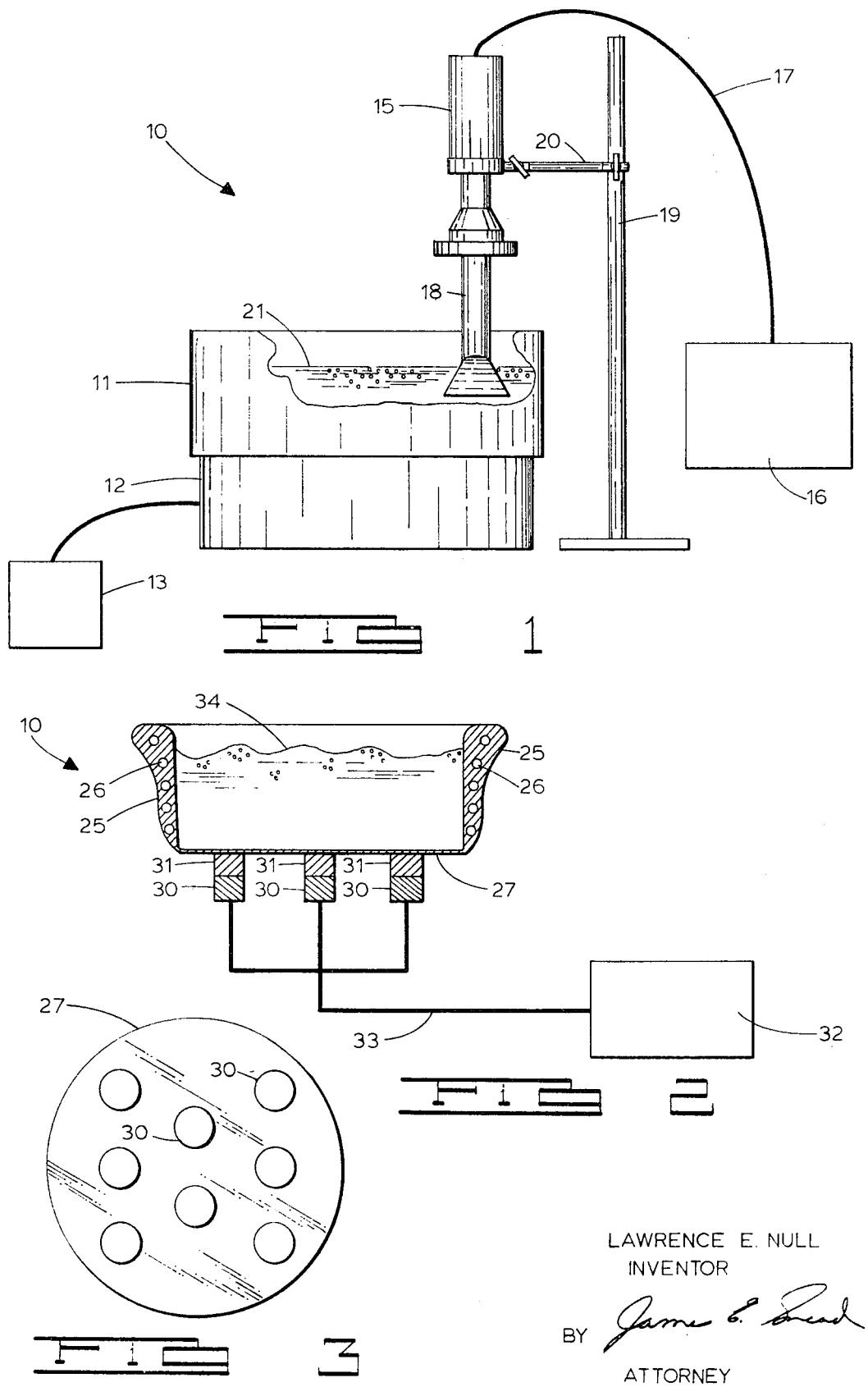

ULTRASONIC COOKING APPARATUS

Ultrasonics is a growing field, finding applications in many area. Ultrasonic energy has been applied experimentally in cooking, cleaning and testing. Perhaps one of the most generally known uses for ultrasonic energy is in welding delicate materials, or materials which have heretofore not been compatible to previously known welding methods.

Additionally ultrasonic energy has been used for tenderizing food prior to cooking, freezing and defrosting food and in treating milk. However, previous to the present invention, the use of sound energy in the ultrasonic range for accelerating the cooking process was not known, nor was any apparatus in existence for cooking food with the aid of ultrasonic energy.

In the preparation of foods, it is well known that it is difficult to achieve both a rapid cooking time and tender food. MOreover, the present devices for rapid frying of foods deposit a relatively large quantity of grease on the food, or in it, or they require precooking of the food prior to its final frying. There is, therefore, a great need for a method of cooking food at a greatly accelerated rate which results in a final product which is tender, flavorful and nongreasy.

Application of energy in the microwave frequency range serves merely to directly increase the excitation level of the molecules in the food to thus increase its temperature and aid in cooking. In the microwave cooking operation there is no increased movement of the cooking liquid or cavitation of the cooking liquid around the food being cooked in any substantial degree. The latter two phenomena are present, however, when ultrasonic energy is applied to the cooking liquid.

It has been found that application of ultrasonic energy in the 15 to 200 Kilohertz (kHz.) frequency range to a heated cooking medium, such as cooking oil or water, increases the excitation level of an item wholly or partially immersed in the medium by three phenomena. First the energy is conducted directly into the cooking item as in microwave cooking. Second, the movement of the cooking liquid around the cooking item is increased aiding the heat transfer process from the cooking liquid into the item being cooked. Third, the ultrasonic energy causes cavitation of the cooking liquid adjacent to the item being cooked to further aid in heat transfer into the item.

It is therefore an object of this invention to provide a cooking method which accelerates cooking time while at the same time thoroughly cooking the food, resulting in a tender final product with a minimum of grease on its surface or in its interior.

Another object of this invention is to provide a method of cooking which combines the use of a normal cooking medium with application of ultrasonic energy thereto to accelerate the cooking process.

A further object of the present invention is to provide an improved apparatus and method for cooking by the application of ultrasonic energy to food as it is being cooked.

Another object of the present invention is to provide an apparatus and method for increasing the heat transfer efficiency between a cooking liquid and an object being cooked by the application of ultrasonic energy to the cooking liquid.

Another object of the invention is to provide an improved cooking apparatus and method whereby the cooking time is substantially reduced and the cooking efficiency increased.

Other objects and advantages of the present invention will become obvious as the same is better understood by reference to the following specification and accompanying drawings wherein:

FIG. 1 is a cross-sectional view of one embodiment of the cooking apparatus comprising this invention.

FIG. 2 is a cross-sectional view of a second apparatus incorporating the present invention.

FIG. 3 is a bottom view of the device shown in cross section in FIG. 2 showing one array of transducers useful with the present invention.

Referring now to FIG. 1, improved cooking apparatus 10 comprises a cooking liquid container 11 having attached thereto a heater 12 which may be an electrical or gas heater or some other suitable type heater and in fact could be a deep fat fryer. A power supply 13 may be coupled into heater 12 to provide the heating power therefore. Alternatively, container 11 could be a kitchen utensil and heater 12 a cookstove.

An ultrasonic transducer 15 is coupled to an ultrasonic power supply 16 through electrical connector 17. Ultrasonic power supply 16 may be one of many well-known ultrasonic power supplies, the only requirement being that it be able to produce sufficient acoustical watts of power for the particular cooking operation being undertaken. Various power supplies ranging from 100 to 2,500 acoustical watts may be used. Specific power supplies for specific cooking requirements could be designed for special cases.

Transducer 15 is coupled into the cooking liquid 21 in container 11 through an acoustical horn 18. The size and shape of acoustical horn 18 is not critical to the invention although better results are achieved if it is tuned to the resonance of container 11 holding cooking fluid 21. Transducer 15 may be one of several presently on the market. It has been found that transducers of the ferrite type and more efficient and durable at cooking temperatures than ceramic or piezoelectric transducers although both types have been satisfactorily used for cooking.

Transducer 15 and its attached acoustical horn 18 may be movably positioned adjacent the container 11 by a stand 19 or other similar device. A radial arm clamp 20 may affix transducer 15 to stand 19 so that either the position of transducer 15 may be adjusted within radial arm clamp 20 or the entire transducer and clamp may be moved on stand 19.

The operation of the device in FIG. 1 is as follows: Cooking liquid such as cooking oil, water or the like is placed in container 11. The cooking liquid is raised to the desired temperature for the item being cooked and the item to be cooked is placed in the liquid. Acoustical horn 18 is then lowered into the cooking liquid, power supply 16 is activated and the ultrasonic energy from transducer 15 is transmitted into cooking liquid 21 by acoustical horn 18. The ultrasonic energy causes increased fluid flow around the item being cooked, it causes liquid cavitation adjacent the item being cooked and directly raises the level of excitation of the molecules of the item being cooked. Thus the cooking time is decreased.

The device shown in FIGS. 2 and 3 accomplishes the same result at the device shown in FIG. 1 with the arrangement of the parts being different. Thus improved cooking apparatus 10 comprises a cooking vessel 25 formed of heat-conducting material and having embedded in the walls thereof heating coils 26. Heating coils 26 are only one example of a means for heating container 25. Other means could be used to accomplish the same result. The particular container 25 shown has a relatively thin bottom 27. The thickness of this portion of the container is critical since a thickness of greater than 0.08 inch dampens the energy transmitted therethrough to such an extent that the device is effectively inoperative. Acoustical transducers 30 are attached to acoustical horns 31, which may take the form of aluminum blocks, which are in turn attached to bottom 27 of container 25. Transducers 30 are electrically connected to an ultrasonic power supply 32 by electrical connectors 33. The number and array of transducers connected to the bottom 27 of cooking vessel 25 are a matter of design characteristics and may be varied according to the shape of the container, the material of which it is composed, the item being cooked and the type of cooking fluid. One array of transducers 30 are shown in FIG. 3. This particular array consists of eight transducers although many variations are possible. A cooking fluid 34 such as cooking oil, water or the like is contained within cooking vessel 25 when the device is in operative condition.

The operation of the device is substantially the same as the operation of the device shown in FIG. 1 except that transducers 30 are not immersed in the cooking liquid 34.

The method of the present invention in its broadest form consists simply of steps of heating a cooking liquid such as cooking oil, water or the like to a desired cooking temperature in the range of approximately 200° to 400° F., at least partially immersing the item to be cooked in the cooking liquid and applying ultrasonic energy to the liquid within the desired frequency range for the particular item being cooked for sufficient time to make the food edible. The period of application of the energy to the liquid varies with the particular food being cooked and the degree of doneness desired.

The method of this invention finds ready application in many varied cooking situations. For example foods which are delicate or subject to becoming waterlogged, such as corn on the cob, are cooked so fast that the water cannot penetrate. Other foods which are too bulky or tough to be cooked rapidly, or which require being thoroughly cooked, such as chicken, pork, or beef, are thoroughly cooked in much less time than is normally required, thus preserving the flavor and reducing shrinkage as in the usual case. In cooking situations utilizing deep fat frying either with or without pressure, the long cooking process results in deep penetration of the grease into the food, or the food must be precooked resulting in loss of time or increased shrinkage. The present method eliminates these problems since cooking time is reduced to the extent that there is little shrinkage or grease penetration into the food and no precooking is necessary.

Two different apparatus are shown which are used to carry out the cooking method, the steps of which are broadly outlined above. Other similar devices can be used which accomplish the steps of the invention. Several cooking operations have been performed utilizing the present invention and they will be described herein.

The first experiment involved the frying of chicken. This experiment was carried out utilizing approximately 100 to 1,000 watts of acoustical power, with the preferred power being 800 watts, in the 15 to 100 Kilohertz range with the preferred frequency being 20 Kilohertz. A piezoelectric transducer was used. It was found that 2 gallons of cooking oil required about 800 to 1,000 acoustical watts of power at 20 Kilohertz frequency to obtain the most satisfactory results. This experiment was carried out along with a similar experiment without the application of ultrasonic energy. It was found that to satisfactorily cook the chicken without ultrasonic energy being applied required 16 to 18 minutes whereas the chicken was thoroughly cooked in 5 to 6 minutes with the application of ultrasonic energy. The flavor of the final product was much better than the flavor of the chicken cooked without the application of ultrasonic energy with the grease penetration being almost negligible.

The second experimental use of the invention involved the cooking of dried pinto beans.

It is known that to satisfactorily cook dried pinto beans under normal cooking methods required soaking the beans in water for a number of hours, usually 12, and then cooking for several more hours at approximately 206° F. In the present experiment the dried pinto beans were cooked in water at temperature in the range of 150° to 250° F., with the preferable cooking temperature being 206° F. at approximately 5,500 feet altitude. A ceramic transducer with an immersible acoustical horn was used and ultrasonic energy was applied to the cooking liquid in the range of 15 to 200 Kilohertz, with the preferable frequency found again to be 20 Kilohertz. Eight hundred acoustical watts were used and the required cooking time was 10 to 20 minutes with no soaking.

The third experiment involved boiling potatoes. Again a range of 100 to 2,500 acoustical watts in the 15 to 200 Kilohertz frequency range were applied to the potatoes with the preferred power being 800 acoustical watts at 20 Kilohertz. The potatoes were cut up in pieces of approximately 1 cubic inch each. The required cooking time was 9½ minutes whereas 19 minutes cooking time was required in a similar experiment without the application of ultrasonic energy.

Many different embodiments of the present invention become obvious in light of the above teachings. It is not intended that the present invention be limited to the specific structure or apparatus shown nor is it limited to the examples given showing the results of the method. Many equivalent types of apparatus and examples will become obvious in view of the above teachings.

What is claimed is:

1. In an improved cooking apparatus the combination comprising:
    a cooking vessel containing cooking liquid therein;
    heat source means operably connected to said cooking vessel for supplying heat to the cooking medium contained therein;
    an ultrasonic energy source comprising an ultrasonic power supply, ultrasonic transducer means, acoustical horn means and electrical connection means for connecting the input of said transducer means to the output of said power supply;
    said acoustical horn means being operably connected to the output of said transducer and directly inserted into and acoustically connected into the cooking liquid in said cooking vessel;
    an upright stand having a radial arm adjustably connected thereto, said radial arm having a first end adjustably attached to said stand and a second end having clamping means attached thereto for engaging said transducer and adjustably holding the same in proximity to said cooking vessel;
    whereby ultrasonic energy is coupled from said transducer into said cooking liquid.

2. The invention as defined in claim 1, wherein;
    said acoustical horn means are shaped so as to be tuned to the resonant frequency of said cooking vessel.

3. In an improved cooking apparatus, the combination comprising:
    a cooking vessel containing cooking liquid therein;
    heat source means operably connected to said cooking vessel for supplying heat to the cooking medium contained therein;
    an ultrasonic energy source comprising an ultrasonic power supply, ultrasonic transducer means, acoustical horn means and electrical connection means for connecting the input of said transducer means to the output of said power supply;
    said acoustical horn means being operably connected to the output of said transducer and directly inserted into and acoustically connected into the cooking liquid in said cooking vessel;
    said cooking vessel is formed of heat-conducting material and said heat source means comprises electrical heating coils attached to the walls of said cooking vessel;
    said cooking vessel has sidewalls and a bottom forming one contiguous member with the sidewalls being greater than one-eighth of an inch thick and having said electrical heating coils fixedly attached thereto and said bottom being less than 0.08 of an inch thick;
    said transducer means comprising a plurality of transducers removably attached to an equal number of acoustical horns which are in turn attached to the bottom of said cooking vessel in a predetermined array;
    whereby ultrasonic energy is transmitted from each of the transducers to the acoustical horns and thence through the bottom of said cooking vessel into the cooking liquid.

4. The invention as defined in claim 3, wherein;
    said electrical heating coils are fixedly attached to said cooking vessel to form a unitary structure therewith.

5. The invention as defined in claim 3, wherein;
    said plurality of acoustical horns comprise aluminum blocks of the same configuration as said transducers.

* * * * *